United States Patent [19]

Chiang et al.

[11] Patent Number: 5,311,456

[45] Date of Patent: May 10, 1994

[54] ARRANGEMENT FOR FINDING A GROUP OF CONTIGUOUS CHANNELS IN A CHANNEL GROUP

[75] Inventors: Lily C. Chiang; Geoffrey E. Margrave, both of Naperville, Ill.

[73] Assignee: AT&T Bell Laboratories, Murray Hill, N.J.

[21] Appl. No.: 68,869

[22] Filed: May 28, 1993

[51] Int. Cl.$^5$ ............................................. G06F 7/00
[52] U.S. Cl. ............................................. 364/715.11
[58] Field of Search ............... 364/715.11; 371/67.1, 371/68.1; 375/96; 340/146.2

[56] References Cited

U.S. PATENT DOCUMENTS

| | | | |
|---|---|---|---|
| 3,881,101 | 4/1975 | Pederson et al. | 364/715.11 |
| 4,361,896 | 11/1982 | Garner | 375/96 |
| 4,404,542 | 9/1983 | Thomas, Jr. | 364/715.11 |
| 4,725,812 | 2/1988 | Kloppe | 364/715.11 |
| 4,847,877 | 7/1989 | Besseyre | 364/715.11 X |

Primary Examiner—Tan V. Mai
Attorney, Agent, or Firm—Werner Ulrich

[57] ABSTRACT

In modern telecommunications networks, a 64 kilobit/second channel is frequently used for transmitting data. Sometimes, there is a requirement for transmitting data at a rate that is a multiple of that rate; in that case, the use of a group of contiguous channels is advantageous. The invention relates to an efficient method of searching for such a group. A table of parameters is stored in memory, the parameters identifying the number of adjacent available channels in the high order, middle, and low order channels of a group of eight channels, given the binary value of the availability of the group of eight channels. These parameters are accessed using the availability pattern of the high eight, middle eight and low eight channels of a 24 channel group. The parameters are then examined, singly and in appropriate groups to determine if a group of contiguous channels of the right size is available.

8 Claims, 1 Drawing Sheet

ARRANGEMENT FOR FINDING A GROUP OF CONTIGUOUS CHANNELS IN A CHANNEL GROUP

TECHNICAL FIELD

This invention relates to the selection of available facilities in telecommunications systems.

PROBLEM

One of the most common types of digital telecommunications carrier systems is the 24 channel T carrier system and the corresponding 30 channel systems in use in Europe. Each channel of such a system conveys 64 kilobits per second of data. If it is desired to transmit a multiple of 64 kilobits, for example, 320 kilobits, then the most straightforward way of accomplishing this goal is to use five contiguous channels of the 24 or 30 channel system. A problem arises because the process of finding whether any group of contiguous channels is available is very time consuming. Accordingly, a problem of the prior art is the that there no way of efficiently identifying a group of contiguous channels in a carrier facility.

SOLUTION

The above problem is solved and an advance is made over the prior art in accordance with our invention wherein a search table is made available in memory; the table addressed using a binary subword representing the activity of a subgroup of contiguous channels; the table contains three bytes per entry, one byte (L) representing the number of contiguous idle channels starting with the right most position, another byte (H) for the same information starting with the left most position, and a third byte (M) representing the highest number of contiguous idle channels within the group having a busy channel adjacent on each side. The three bytes are addressed using the activity state of each of the subwords. An adequate size group will then be available if either one of the three M values is adequate, or if the sum of an H and the left adjacent L (or if the left adjacent L equals the size of the subword, an additional left adjacent L, the process being continued). In one specific implementation the subgroups are subgroups of eight channels and the table is therefore three bytes times 256 entries long. Advantageously, this arrangement allows for a very rapid search for each group of 24 (or 30 channels for a European system) to see if the required number of contiguous available channels exists in a channel group. Note that an efficient search for such a group is important since, especially during the busy hour, a large number of channel groups may have to be searched to find the appropriate number of contiguous available channels.

DETAILED DESCRIPTION

Figure 1:
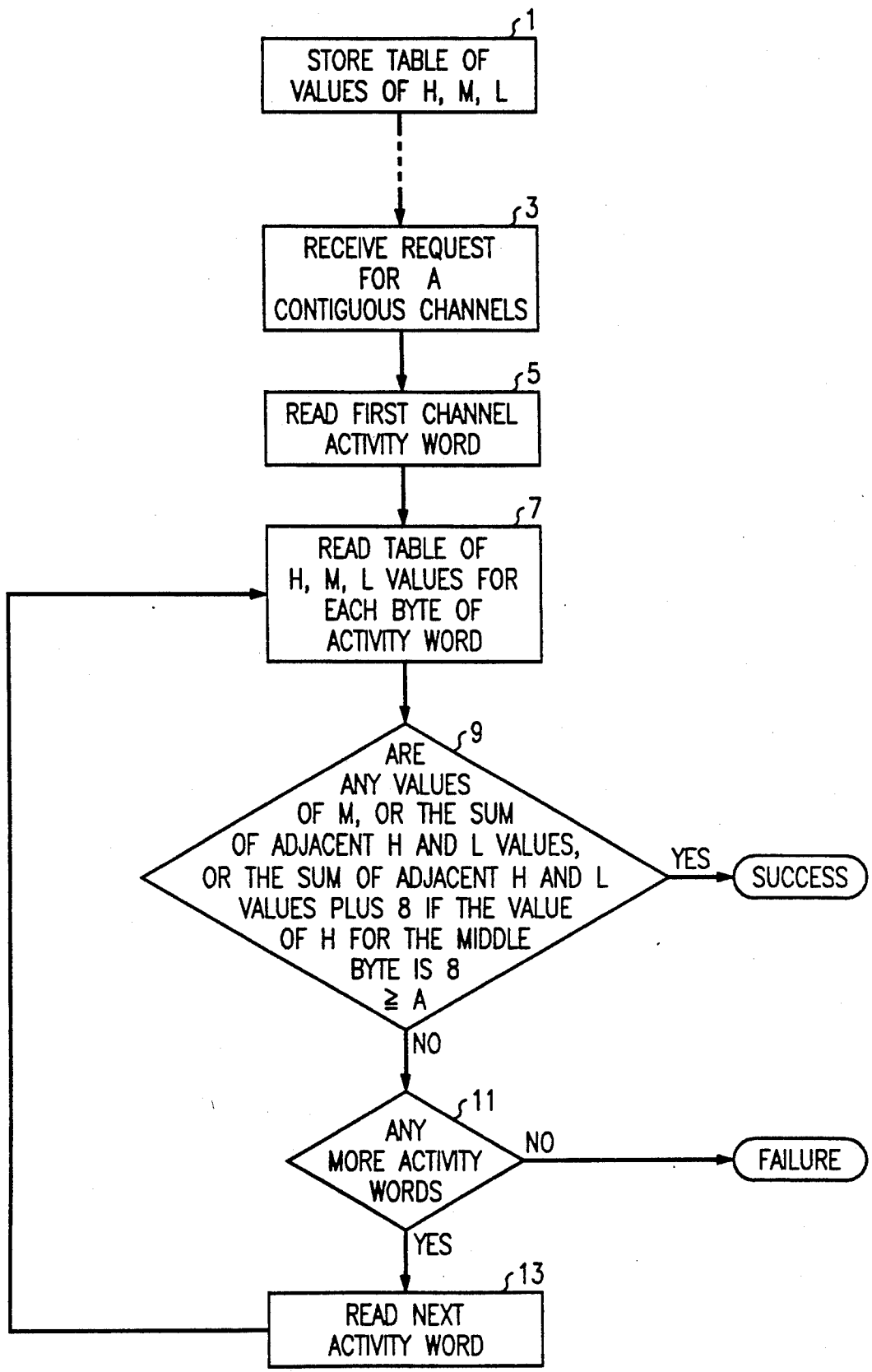
FIG. 1 is a flow diagram of an algorithm for searching for an available group of contiguous channels.

Table I shows a few typical entries of the 256 entries of the search table for the case in which the channel activity word of length T=24 is broken up into three subwords (bytes) of length c(1)=c(2)=c(3)=8. The values of the three bytes are denoted C(1), C(2) and C(3). The values of H, M and L corresponding to a particular value of, say, C(2) are H[C(2)], M[C(2)] and L[C(2)]. The values of C(1), C(2) and C(3) are simply the busy/idle state of the eight channels in the subgroup expressed as a binary number. This binary number is used to access the H, M, L table. The H value corresponding to a particular byte value is the number of continuous bits set to one (in this case one is the binary value B that indicates "available") starting from the highest position of the accessing byte; the M value is the number of the longest contiguous set of ones sandwiched by zeroes on both sides in the bit pattern of the accessing byte; and the L value is the number of contiguous bits set to one starting from the lowest bit position of the bit pattern of the accessing byte. For example, if the byte value is two, (i.e., 00000010) then both the H and the L values are zero since there are no strings of contiguous ones starting from either the highest or the lowest bit position, but M=1 since there is an instance of a single one surrounded by zeroes on both sides. For byte value three, the L value is two (the two lowest order bits are one), but both the H value and the M value are zero since there is no case of a string of ones surrounded by zeroes and since the highest bit is zero. For byte value 129 the H value and the L value are both one (a single one in the high and in the low position) and the M value is zero because there are no ones surrounded by zeroes. For byte value 239 the H value is three, and the L value is four, and the M value is zero. And finally, for byte 255 both the H and the L values are eight.

As an example, the 24 bit string of Table II represents the busy/idle status of a group of 24 channels. The 24 bit string is broken down into three eight bit substrings.

TABLE I

| byte value | bit pattern | H value | M value | L value |
| --- | --- | --- | --- | --- |
| 0 | 00000000 | 0 | 0 | 0 |
| 1 | 00000001 | 0 | 0 | 1 |
| 2 | 00000010 | 0 | 1 | 0 |
| 3 | 00000011 | 0 | 0 | 2 |
| 4 | 00000100 | 0 | 1 | 0 |
| 5 | 00000101 | 0 | 1 | 1 |
| . | | | | |
| 44 | 00101100 | 0 | 2 | 0 |
| . | | | | |
| 79 | 01001111 | 0 | 1 | 4 |
| . | | | | |
| 111 | 01101111 | 0 | 2 | 4 |
| . | | | | |
| 126 | 01111110 | 0 | 6 | 0 |
| . | | | | |
| 129 | 10000001 | 1 | 0 | 1 |
| . | | | | |
| 239 | 11101111 | 3 | 0 | 4 |
| . | | | | |
| 254 | 11111110 | 7 | 0 | 0 |
| 255 | 11111111 | 8 | 0 | 8 |

TABLE II

|  | 11101111 | 10000001 | 00000100 |
| --- | --- | --- | --- |
| byte order: | 3rd | 2nd | 1st |
| byte value: | 239 | 129 | 4 |
| H,M,L values: | 3,0,4 | 1,0,1 | 0,1,0 |

For a call requesting A=5, the algorithm checks the M and L values of the first byte (using byte value (4) as the index to Table I) to see if 5 contiguous 1's can be found. The algorithm checks the M values of the second and third bytes (using byte values 129 and 239 as indices to Table I) and the H value of the third byte. The algorithm also checks the number of contiguous 1's across byte boundaries, by adding the L value of the second byte to the H value of the first byte and the L value of the third byte to the H value of the second byte. By adding the L value (4) of the third byte and H value (1) of the second byte, 5 contiguous idle members are found. In terms of the notation herein, C(1)=4, C(2)=129, C(3)=239, and, for example M[C(1)]=1, H[C(2)]=1 and L[C(3)]=4.

FIG. 1 is a flow diagram of a process for determining whether a particular word of length T contains indications of A contiguous available channels wherein the word of length T represents channel availability for each of the T channels of the word. The flow diagram of FIG. 1 represents the case in which 24 channels are used in each basic channel group and wherein T is 24. The word is broken down into three eight bit segments, each segment being one byte long. A table having the same contents as Table I, previously described, is stored (action block 1); this table contains the H, M, and L values for each of the 256 possible values of a byte. After having initialized the system through the storage of the table, a request is received for A contiguous channels (action block 3). The system reads a first channel activity word (action block 5) of length T=24 bits. The table of H, M, and L values for each of the three bytes of the activity word is then read (action block 7). The three H, M, and L sets of bytes are then examined to see if any of the M values equal or exceed A; or if the sum of adjacent H and L values equal or exceed A; or, if the H value of the middle byte is eight, to see if the sum of eight plus the L of the high order byte and the H of the low order byte equals or exceeds A; or if the L value for the lowest byte or the H value for the highest byte equals or exceeds A. If the result of any of these tests is positive, the search is successful. If not, test 11 determines whether any more activity words are available. If the result of test 11 is negative, the search has failed; if more activity words are available, then the next activity word is read (action block 13) and the process of action blocks 7, test 9 and, if necessary, test 11 is repeated.

While the above example has shown the operation of an algorithm for a 24 channel system, the same principles can be applied to a 30 or 32 channel system.

The above arrangement can be used wherever it is necessary to find a group of contiguous available resources wherein availability of a resource is provided by a single binary digit.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of identifying the presence and location of a contiguous string of A repetitions of a prespecified binary value B in a word to be tested of length T, comprising the steps of:

subdividing T into a plurality of segment length c(1), ..., c(d);

storing a table of data comprising a first quantity H[(C(i)], denoting the number of contiguous high order bits of value B in a segment of length c(i) having value C(i) for each possible value of C(i), M[C(i)] denoting the highest number of contiguous bits of value B surrounded on each side by a value $B^1$, a binary inverse of a value of B, in a segment having value C(i) for each possible value of C(i), and L[C(i)] denoting the number of contiguous low order bits of value B in a segment of length c(i) having value C(i) for each possible value of C(i), wherein each C(i) can have values from zero to $2^{c(i)}-1$;

accessing an availability word, of length T, to be tested;

subdividing said accessed word into segments of length c(i), i varying from 1 to d;

for each segment, accessing said table to obtain H[C(i)], M[C(i)], and L[C(i)] for that segment wherein C(i) is a value of segment c(i) of said accessed word; and testing for availability of a contiguous string of A or more repetitions of binary value B by testing values of M[C(i)] and values of H[C(i)]+L[C(i+1)], and testing L[C(1)] and H[C(d)], to determine if any of said values equal or exceed A.

2. The method of claim 1, wherein a plurality of ones of said segments C(i) have a common length; whereby a single table may be used for said plurality of segments.

3. The method of claim 2 wherein T=24, and c(1)=c(2)=c(3)=8.

4. The method of claim 2 wherein T=24.

5. The method of claim 2 wherein T=30.

6. The method of claim 2 wherein T=32.

7. The method of claim 1 wherein if L[C(i)]=c(i), also testing values of L[C(i+1)]+L[C(i)]+H[C(i−1)] to determine if any of said values equal or exceed A.

8. The method of claim 1 wherein if no contiguous strings of length A or greater are found in said testing step, accessing another availability word of length T and repeating said subdividing, accessing and testing steps.

* * * * *